United States Patent [19]
Green

[11] 3,876,025
[45] Apr. 8, 1975

[54] GYROSCOPICALLY STABILIZED ONE-WHEEL VEHICLE

[76] Inventor: Christopher P. Green, 1484 Lakme Way, San Jose, Calif. 95112

[22] Filed: Jan. 8, 1974

[21] Appl. No.: 431,743

[52] U.S. Cl. .................... 180/21; 180/7 P; 280/206
[51] Int. Cl. ........................................... B62d 63/02
[58] Field of Search ........ 180/7 P, 21; 280/206, 207

[56] References Cited
UNITED STATES PATENTS

| | | | |
|---|---|---|---|
| 799,396 | 9/1905 | Mattson | 180/21 |
| 1,046,267 | 12/1912 | Coates | 180/7 P |
| 1,228,100 | 5/1917 | D'Harlingue | 180/7 P |
| 1,915,886 | 6/1933 | Gutierrez | 180/21 X |
| 3,260,324 | 7/1966 | Suarez | 180/21 X |
| 3,746,117 | 7/1973 | Alred | 180/21 |

*Primary Examiner*—David Schonberg
*Assistant Examiner*—Terrance L. Siemens
*Attorney, Agent, or Firm*—Jack M. Wiseman

[57] ABSTRACT

A gyroscopically stabilized single wheel vehicle comprising an outer wheel mounted on a rim, a frame and two directions or degrees of freedom of motion system for mounting the frame on the rim within the wheel. The frame supports a driver's seat, fuel tank, a source of motive power, and the controls necessary for operation of the vehicle. In addition, a propeller is mounted on the frame and driven from the source of motive power and provides a thrust along a horizontal axis. One direction of freedom of motion between the frame and the wheel is controlled by a steering wheel. The other direction of freedom of motion is stabilized by elevators secured to the frame and controllable in their pitch. Rotational displacement of the frame with respect to the wheel around a generally vertical axis creates a primary or initial precessional velocity which tends to tilt the wheel out of a vertical plane. The thrust of the propeller increases this tilt, thereby creating a secondary precessional velocity to rotate the wheel around that vertical axis, thereby effecting a change in the direction of travel of the vehicle. As a turn is being completed and the steering wheel is returned to its center position and then turned in the opposite direction, a velocity vector in the opposite direction is created to bring the wheel back into a vertical plane. The steering wheel is then returned to its center position.

10 Claims, 9 Drawing Figures

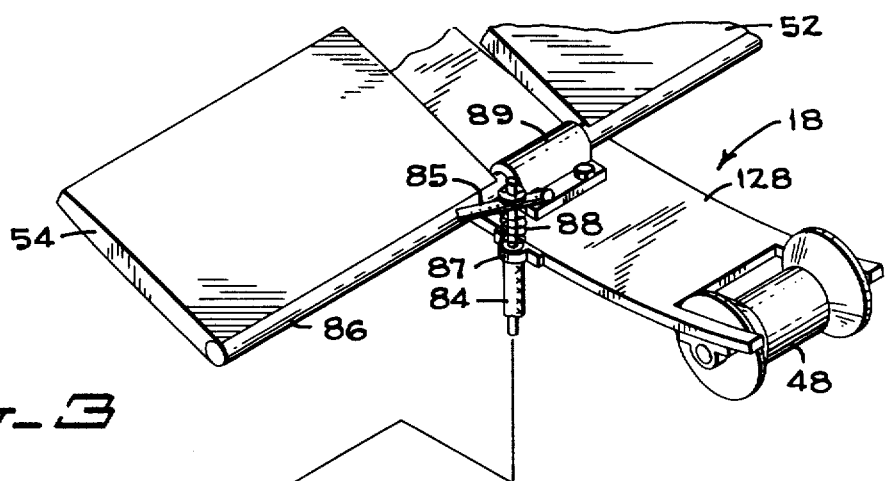
Fig-3
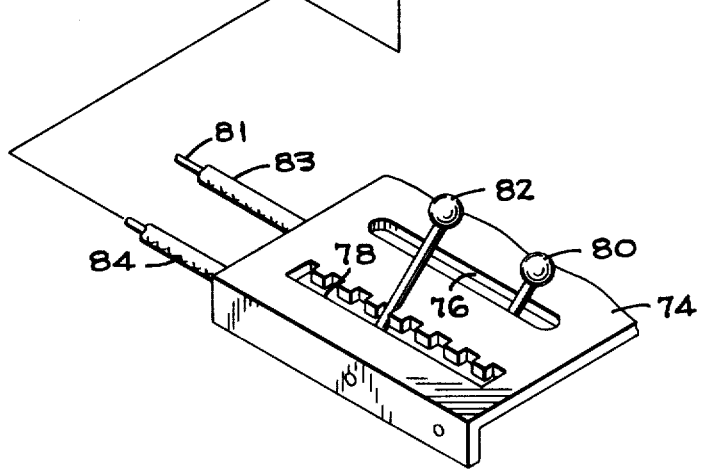
Fig-7
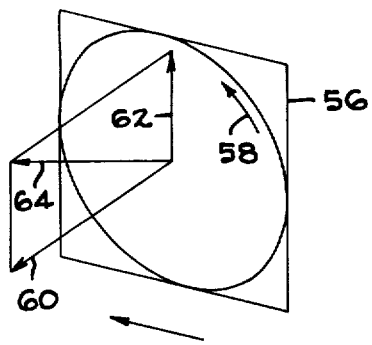
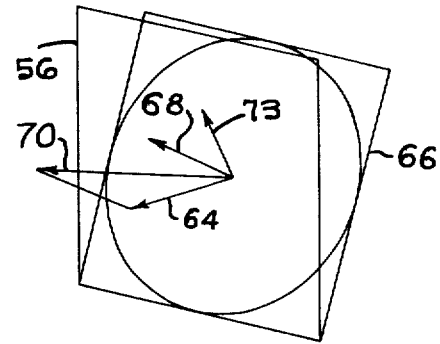
Fig-8
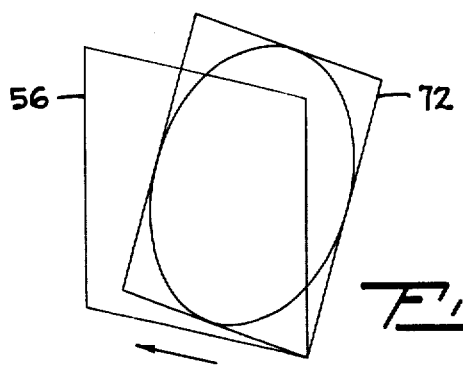
Fig-9

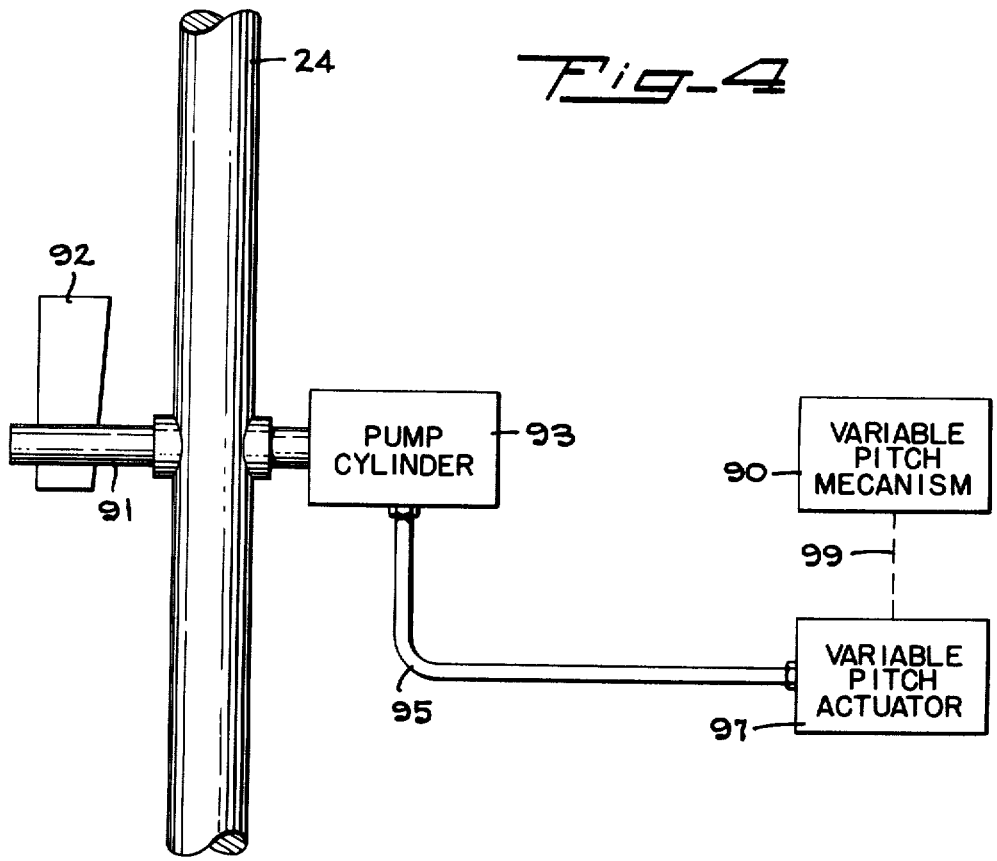

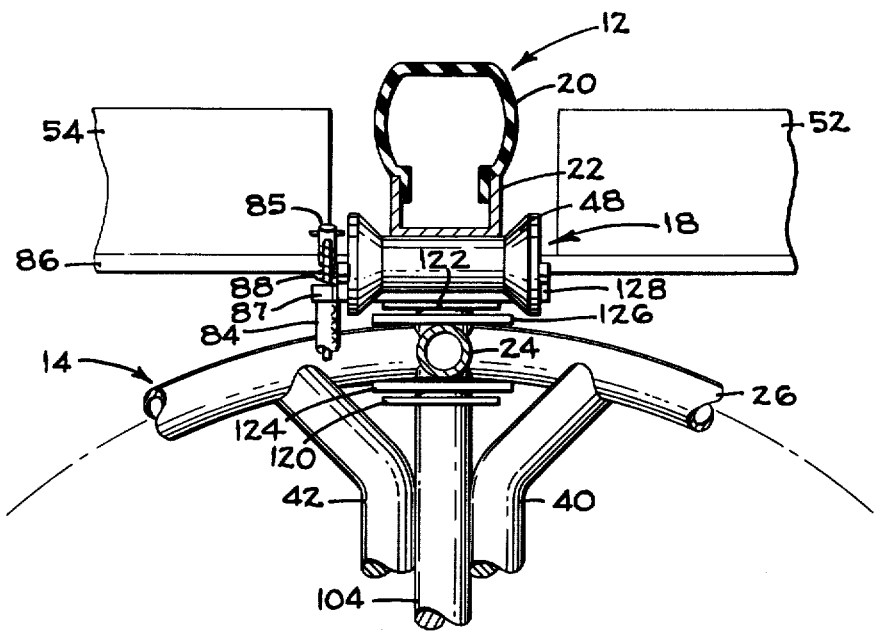
Fig. 5
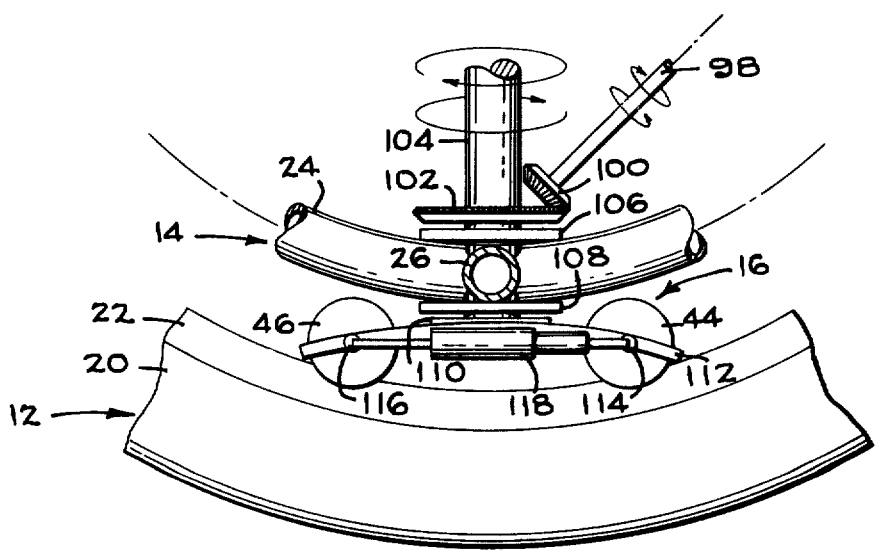

GYROSCOPICALLY STABILIZED ONE-WHEEL VEHICLE

BACKGROUND OF THE INVENTION

1. Field of the Invention

This invention relates generally to vehicles for surface travel, and more particularly to a gyroscopically stabilized single wheeled vehicle having a passenger compartment mounted within the wheel.

2. Prior Art

Self-contained, motorized unicycles are old in the art. Many attempts have been made, as demonstrated by the known art, to design a unicycle type of vehicle which is capable of achieving a controlled change in direction of travel while maintaining sufficient stability. The majority of such prior known vehicles rely upon the operators ability to lean, thereby shifting the center of gravity to cause a change in the direction of travel. Some of the known unicycle type of vehicles employ a mechanism for shifting the weight of part of the vehicle with respect to the remaining part to effect a change in direction of travel. The change in direction of travel cannot be achieved with any degree of stability in view of reliance entirely upon a change in the center of gravity.

Examples of such prior known unicycle type of vehicles which rely upon a lateral shift of weight to effect a change in direction are disclosed in U.S. Pat. Nos. 1,265,496; 2,009,904; 2,107,766; 2,267,254; 3,206,324 and 3,399,742. It can be readily appreciated from a study of these patents that such vehicles cannot attain a relatively small turning radius.

Another known unicycle type of vehicle employs a pair of wheels which are co-axial and relatively closely spaced to one another. Turning of such a vehicle is effected by changing the rotational speed of one of the wheels with respect to the other wheel. It can be readily appreciated that such an arrangement provides a relatively small turning radius, but the stability depends upon the relative spacing between the wheels. Examples of such vehicles are disclosed in U.S. Pat. Nos. 1,357,571 and 2,372,043.

It is well known that gyroscopes are employed for controlling the stability of a vehicle. An example of stabilizing gyroscope in combination with a vehicle is disclosed in U.S. Pat. No. 3,237,885. Gyroscopes have also been employed to change the direction of a vehicle. U.S. Pat. Nos. 1,191,566 and 1,290,087 disclose a unicycle type of vehicle which employ a pair of gyroscopes mounted coaxially with the traction wheel of the unicycle. A change in direction is effected by translating the gyroscope wheels laterally along the central or spin axis. As disclosed in U.S. Pat. No. 3,145,797, a gyroscope can be employed for changing the direction of a vehicle by changing the direction of the spin axis of the gyroscope.

SUMMARY OF THE INVENTION

Although it can be appreciated that each of the above-described vehicles have advantages which are distinctive, they do not provide the flexibility and stability which is desirable in a unicycle. Accordingly, it is a primary object of the present invention to provide a unicycle vehicle which is relatively stable in its operation.

Another object of the present invention is to provide a unicycle which is capable of achieving a relatively small turning radius under stable conditions.

A further object of the present invention is to provide a unicycle vehicle which employs the principles of a gyroscope to maintain a relatively high degree of stability under all types of conditions.

These and other objects of the present invention are attained by mounting a frame within the rim of a wheel for two directions of freedom of motion therebetween and providing means for imparting a thrust to the frame. The wheel acts as a gyroscope with one direction of freedom of motion being around its spin-axis and the other direction of freedom of motion being perpendicular to the spin-axis and generally vertical.

A feature of the present invention resides in the provision of means for controlling one direction of freedom of motion in the freedom of motion system to provide for movement of the spin-axis, thereby developing a primary of initial precessional velocity.

Another feature of the present invention resides in the provision of a thrust producing member which is located at a position to assist or augment a secondary precessional velocity which is developed, thereby permitting the wheel and the frame to rotate together in a relatively small turn radius when the direction of the vehicle is being changed.

These and other objects, features and advantages of the present invention, however, will be more fully realized and understood from the following detailed description, when taken in conjunction with the accompanying drawings, wherein:

BRIEF DESCRIPTION OF THE DRAWINGS

FIG. 3 is a fragmentary view in perspective, partially broken away, of part of the controls associated with the vehicle illustrated in FIG. 1.

FIG. 4 is a fragmentary view, partially broken away, of another control mechanism associated with the vehicle illustrated in FIG. 1.

FIG. 5 is a fragmentary enlarged, detailed view, partially in section and partially broken away of the upper support mechanism of the vehicle illustrated in FIG. 1.

FIG. 6 is a fragmentary enlarged and detailed view, partially in section and partially broken away, of the lower support mechanism of the vehicle illustrated in FIG. 1.

FIGS. 7, 8 and 9 are diagrammatic illustrations and vector diagrams of velocities which are attained during a change in the direction of travel of the vehicle.

Like reference numerals throughout the various views of the drawings are intended to designate the same elements.

DETAILED DESCRIPTION OF THE PREFERRED EMBODIMENT

Figure 1:
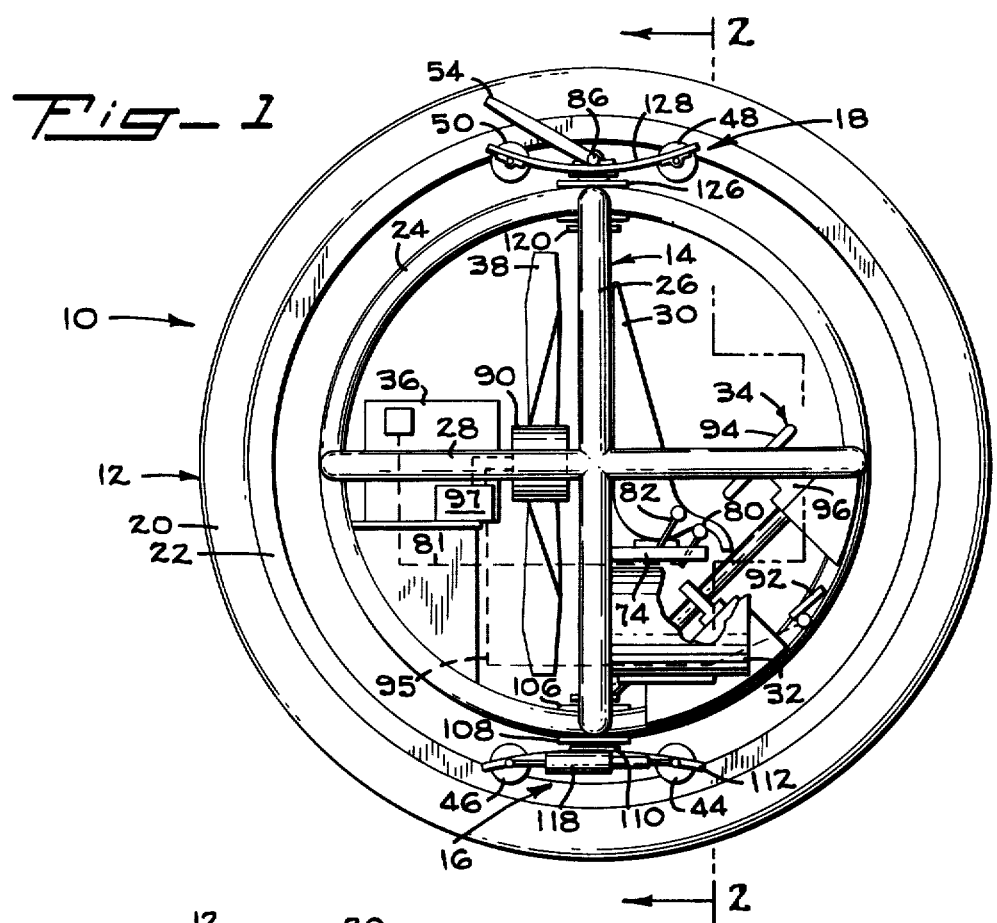
FIG. 1 is a diagrammatic side elevational view of a gyroscopically stabilized single-wheeled vehicle constructed in accordance with the principles of the present invention.

With reference to FIG. 1 of the drawings, there is shown a gyroscopically stabilized single-wheel vehicle constructed in accordance with the principles of the present invention and generally designated with the reference number 10. The vehicle 10 is generally formed of a wheel-portion 12, a frame 14, and two directional or degrees of freedom of motion system including a lower portion 16 and an upper portion 18. The wheel 12 includes a pneumatic tire 20 mounted on a rim 22. It is to be understood, of course, that any suitable wheel structure may be employed.

The frame 14 is formed of a plurality of tubular members 24, 26 and 28 which are joined to one another at opposite diametric points. In addition, a pair of tubular supports 40 and 42 (FIG. 2) extend diametrically across the tubular member 26. The frame 14 (FIGS. 1 and 2) is disposed for supporting a driver's seat 30, fuel tanks 32, a steering mechanism 34, an engine 36, a propeller 38 or other suitable thrust mechanisms, and the controls necessary for the operation of the vehicle. The driver's seat 30, fuel tanks 32, steering mechanism 34, and operator's controls are located at the forward end of the frame 14. The engine 36 and propeller 38 are mounted at the rearward end of the frame 14 behind the driver's seat 30.

Figure 2:
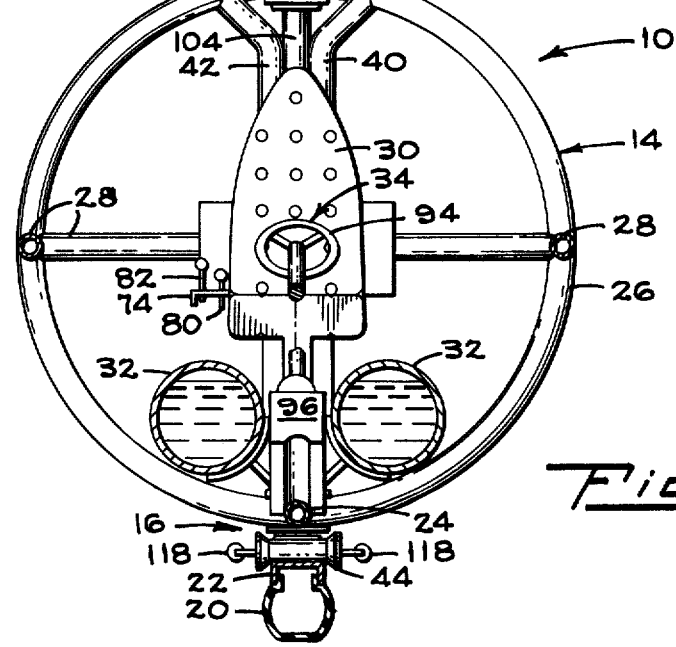
FIG. 2 is a sectional view taken generally along line 2—2 in FIG. 1.

As shown in FIGS. 1 and 2, the frame 14 is supported within the wheel 12 on the rim 22 by the two directional freedom motion system including the lower portion 16 (FIG. 6) and the upper portion 18 (FIG. 5). The lower portion 16 of the two directional or degrees of freedom of motion system includes a pair of rollers 44 and 46 (FIGS. 1 and 6) which are disposed for riding upon an inner peripheral surface of the rim 22. The upper portion 18 of the two directional or degrees of freedom of motion system includes a pair of rollers 48 and 50 (FIG. 1) which are disposed for engaging the inner peripheral surface of the rim 22. The rollers 44, 46, 48 and 50 permit the frame 14 to remain generally vertical while allowing the wheel 12 to rotate around the spin-axis thereof.

As shown more clearly in FIGS. 5 and 6, and as will be described in greater detail hereinafter, the frame 14 is mounted for rotational movement with respect to the wheel 12 around a generally vertical axis which is perpendicular to the spin-axis of the wheel. The steering assembly 34 provides manual control of the relative displacement around this vertical axis of the frame 14 with respect to the wheel 12. A pair of stabilizing fins or elevators 52 and 54 (FIGS. 2, 3 and 5) are mounted on the upper portion 18 of the two directional or degrees of freedom of motion system and are controlled in their pitch as will be described below for stabilizing the displacement of the frame 14 with respect to the wheel 12 around the spin-axis thereof.

It can be appreciated, therefore, that the frame 14 can be displaced about a generally vertical axis with respect to the wheel 12, while it is in motion to effect a change in the direction of travel of the vehicle. A diagrammatic illustration of the velocity vectors associated with such a change and of the vehicle during such a change in the direction of travel of the vehicle is illustrated in FIGS. 7-9. As shown therein, as the wheel 12 is rotating in a plane 56 in the direction of an arrow 58, a velocity vector, indicated with the reference numeral 60, will extend perpendicular from the plane 56 as illustrated in FIG. 7. If a force is exerted on the wheel 12 which will tend to rotate the wheel around a vertical axis, a velocity vector indicated with the reference number 62 will be generated. These two velocity vectors 60 and 62 combine to produce a velocity vector which is indicated with the reference numeral 64. As a result of this primary or initial precessional velocity vector, the wheel 12 will tend to tip from the plane 56 toward a plane designated with the reference numeral 66 in FIG. 8. Rotation of the wheel 12 from the plane 56 to the plane 66 generates a secondary precessional velocity vector designated with the reference numeral 68. The velocity vectors 64 and 68 combine to produce a velocity vector which is indicated with the reference numeral 70. As a result of the secondary precessional velocity vector 68, the wheel 12 will tend to rotate from the plane 66 toward a plane designated with the reference numeral 72 in FIG. 9. The secondary precessional velocity vector illustrated in FIG. 8 is augmented by the thrust of the propeller 38, since the frame of 14 will have rotated through a relatively small angle with respect to the wheel 12 around a generally vertical axis. Accordingly, the propeller 38 will generate a thrust in a direction indicated by an arrow designated with the reference numeral 73 to augment the secondary precessional velocity.

With the above brief description, the operation of the vehicle will be better understood from the following description of the specific details. The seat 30 (FIG. 1) is mounted on a platform 74 which, in turn, is secured to the tubular supports 40 and 42. One end of the platform 74 is illustrated in FIG. 3 and is provided with a pair of slots 76 and 78 through which control levers 80 and 82 extend, respectively, such that they are disposed for manual operation by the driver.

As shown in FIG. 3, the lever 80 is connected to a cable 81 which is supported in and enclosed by a sheath 83. The cable 81 extends to the carburation unit (not shown) of the engine 36 and permits control of the speed thereof in a well known manner by manual operation of the lever 80. The lever 82 is connected to one end of a sheathed flexible cable 84 having its other end connected to an arm 85 which, in turn, is secured to a common shaft 86 between the elevators 52 and 54. One end of the sheath of the cable 84 is secured to a spring steel suspension bar 128 (see FIGS. 1 and 4) by a bracket 87. A spring 88 extends from the bracket 87 to the arm 85 to bias the arm 85 in a direction to return the elevators 52 and 54 to their normal position. The shaft 86 connecting the elevators 52 and 54 is pivotally mounted in a bearing bracket 89 secured to the bar 128. Accordingly, the pitch of the elevators 52 and 54 is controlled by the lever 82 and the pitch of the frame 14 with respect to the horizontal. By increasing or decreasing the air drag transmitted to the top of the frame 14, the natural tendency of the frame 14 to rotate with the wheel 12 about the spin axis, due to the friction of the rollers 44, 46, 48 and 50, is counteracted.

The engine 36 (FIG. 1) is drivingly connected to the propeller 38 through a variable pitch mechanism 90. A foot pedal 92 is mounted on a shaft 91 which extends through a bearing sleeve in the tubular member 24 to a pump cylinder 93. A pneumatic-hose 95 is connected from an output of the pump cylinder 93 to a variable pitch actuator 97 which, in turn, is connected by a mechanical linkage, represented by a dotted line 99, to the variable pitch mechanism 90. The actuator 97 may comprise, for example, a cylinder and piston and the linkage 99 may comprise a shaft connected to such a piston. Such an actuator and variable pitch mechanisms are well known in the art and details of their construction are not needed for a complete understanding of the present invention. Rotation of the pedal 92 and the shaft 91 causes the pump cylinder 93 to alter the pneumatic pressure in the hose 95 and in the actuator 97 to cause translation of the linkage 99 and a change in the pitch of the propeller 38. The steering assembly 34 includes a steering wheel 94 (FIG. 1) mounted in front of the driver's seat 30 at the disposal of the operator. The steering wheel 94 is connected through a right angle gear drive mechanism 96 to a shaft 98. As shown in FIG. 6, a bevel gear 100 is mounted on one end of the shaft 98 and drivingly engages with a gear 102 secured to a shaft 104. A pair of bearing plates 106 and 108 are rigidly connected to each other via a sleeve which extends through and is secured to the tubular member 24. The shaft 104 extends the sleeve and terminates in a bearing plate 110. Accordingly, the shaft 104 with the gear 102 and the bearing plate 110 rotate with respect to the tubular member 24 and the bearing plates 106 and 108. A spring steel suspension bar 112 is secured at its mid-point to the bearing plate 110 and supports a pair of shafts 114 and 116 at opposite ends thereof. The rollers 44 and 46 are mounted on the shafts 114 and 116, respectively. A shock absorber 118 is secured between the shafts 114 and 116 and is disposed for absorbing and dampening vibrations in the bar 112. The shaft 104 also extends to the upper portion 18 of the two directional freedom of motion system. More particularly, a pair of bearing plates 120 and 122 are secured to the shaft 104 and are disposed for bearingly engaging a pair of bearing plates 124 and 126, respectively. The plates 124 and 126 are rigidly secured to a shaft which extends through and is secured to the frame 14 and is disposed for receiving the shaft 104 therethrough. The suspension bar 128 is rigidly secured to the plate 122 and, as shown in FIG. 3, the elevators 52 and 54 are pivotally mounted on the suspension bar 128.

It can be appreciated from the above that the vehicle of the present invention can be controlled to perform all of the maneuvers necessary for travel. The speed of the engine 36 is controlled by the lever 80 and the pitch of the propeller 38 is controlled by the pedal 92. Accordingly, the vehicle can accelerate through a relatively large range of velocities in both directions.

When it is desired to alter the direction of movement of the vehicle 10, the steering wheel 94 is rotated in one direction or the other to cause the frame 14 to rotate in the direction of the turn and the wheel 12 to rotate in the opposite direction. As shown in FIGS. 7 and 8, a primary precessional velocity causes the wheel 12 to tip, thereby creating a secondary precessional velocity which will cause the wheel 12 to follow a curved path in the direction which the frame 14 is travelling. Accordingly, at the beginning of a turn, the frame 14 is rotated a relatively small angle with respect to the wheel 12.

Subsequently, the frame 14 and the wheel 12 tilt in the direction of the turn, turning along a radius in the horizontal plane. The radius of the turn in the horizontal plane will continue to become smaller, and the tilt of the wheel 12 and frame 14 will increase until the steering wheel is returned to its original position. At that time the wheel 12 and frame 14 will return to their original relative alignment, but both will remain tilted and will continue in the turn until the steering wheel 34 is turned in the opposite direction. This will cause the frame 14 and the wheel 12 to rotate relative to one another in the opposite direction to that used to begin the turn, and both the wheel 12 and the frame 14 will tilt towards the vertical plane until they have both righted themselves. At this point, the steering wheel 34 is returned to its normal position, and the vehicle will proceed in a straight line in its new direction along the horizontal plane, the turn thus being completed.

I claim:
1. A vehicle comprising:
 a. an annular wheel having an inner rim and adapted to rotate generally in a vertical plane on a horizontal surface,
 b. a frame,
 c. means having two directions of freedom of motion for mounting said frame on said rim within said wheel for relative rotational movement with respect to said wheel, with a first direction of freedom of motion being generally about a vertical axis and a second direction of motion about a central axis of said wheel,
 d. means mounted on said frame for imparting a thrust thereto generally along a horizontal axis, and
 e. means for rotationally displacing said frame with respect to said wheel around a generally vertical axis to steer the vehicle.

2. A vehicle as defined in claim 1, wherein said thrust imparting means includes a propeller mounted on a generally horizontal shaft.

3. A vehicle as defined in claim 1, wherein said mounting means includes rollers mounted between said frame and an inner periphery of said rim for providing said second direction of freedom of motion of said frame with respect to said wheel.

4. A vehicle as defined in claim 3, wherein said mounting means includes means for supporting said rollers for pivotal movement with respect to said frame around a generally vertical axis.

5. A vehicle as defined in claim 4, wherein said displacing means includes controllable means secured to said frame and disposed for engaging said supporting means and effecting the rotational displacement of said frame with respect to said wheel around the generally vertical axis.

6. A vehicle as defined in claim 1 wherein said thrust imparting means being reversed for deceleration of the vehicle.

7. A vehicle as claimed in claim 1 wherein said thrust imparting means includes a propeller mounted on a generally horizonal axis in the vicinity of the vertical axis.

8. A vehicle as claimed in claim 1 wherein said wheel includes a pneumatic tire disposed about said rim.

9. A vehicle as claimed in claim 1 wherein said mounting means includes yieldable suspension means.

10. A vehicle comprising:
 a. an annular wheel having an inner rim and adapted to rotate generally in a vertical plane on a horizontal surface,
 b. a frame,
 c. means having two directions of freedom of motion for mounting said frame on said rim within said wheel for relative rotational movement with respect to said wheel, with a first direction of freedom of motion being generally about a vertical axis and a second direction of freedom of motion about a central axis of said wheel,
 d. means mounted on said frame for imparting a thrust thereto generally along a horizontal axis, and e. means for rotationally displacing said frame with respect to said wheel around a generally vertical axis,
f. said mounting means includes rollers mounted between said frame and an inner periphery of said rim for providing said second direction of freedom of motion of said frame with respect to said wheel, said mounting means includes means for supporting said rollers for pivotal movement with respect to said frame around a generally vertical axis,
g. said displacing means includes controllable means secured to said frame and disposed for engaging said supporting means and effecting the rotational displacement of said frame with respect to said wheel around the generally vertical axis,
h. said controllable means includes a steering device and a first gear drivingly secured to said steering device, said supporting means including a second gear bearingly mounted on said frame and engaged by said first gear for imparting rotational displacement thereto.

* * * * *